March 10, 1953 R. R. LAW 2,631,253
ELECTRON-SENSITIVE TARGET FOR COLOR-KINESCOPES, ETC
Filed Aug. 18, 1950
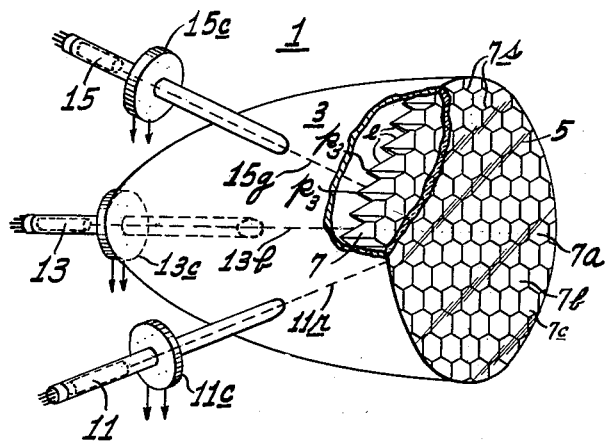
Fig. 1
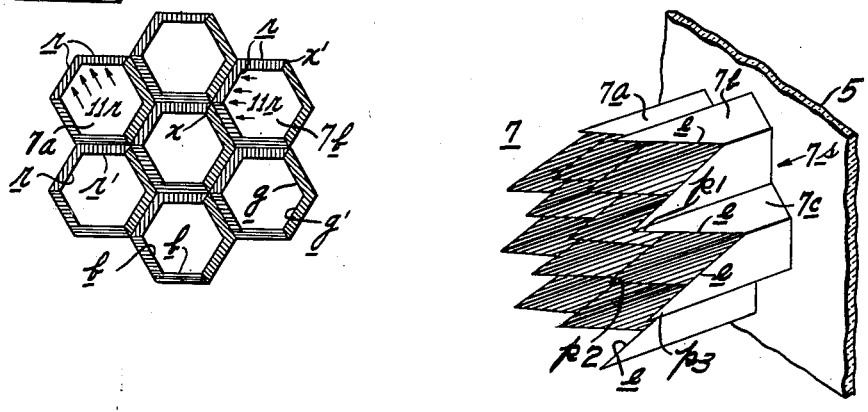
Fig. 2
Fig. 3
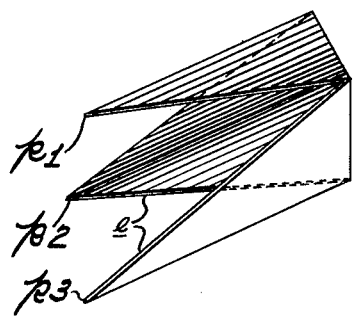
Fig. 4
INVENTOR
Russell R. Law
BY
ATTORNEY Patented Mar. 10, 1953

2,631,253

UNITED STATES PATENT OFFICE 2,631,253

ELECTRON-SENSITIVE TARGET FOR COLOR-KINESCOPES, ETC.

Russell R. Law, Princeton, N. J., assignor to Radio Corporation of America, a corporation of Delaware Application August 18, 1950, Serial No. 180,109

5 Claims. (Cl. 313—70)

This invention relates to improvements in cathode-ray tubes of the type containing a "directional" screen or target of the cellular or "honeycomb" variety and will be described as applied to the solution of the problem of minimizing color-dilution in color-kinescopes of the kind wherein parts of the inner surface of each of the cells of the target are allotted to the different component colors (usually red, blue and green) of the image or scene to be televised.

Several methods of reproducing television images in color are known which make use of a "directional" screen or target-assembly in converting the incoming video signals into polychromatic additive images of the object or scene being televised. (As will be appreciated by those skilled in the art, a "directional" screen is one containing a multiplicity of sub-elemental image-areas which are so constructed and positioned that the sub-elemental area or areas activated at any given instant are determined by the angle at which the beam or beams approach the screen.)

One type of directional screen heretofore used in color-kinescopes comprises a metal "honeycomb" consisting of a multiplicity of contiguous rows of open-ended cells. The cells are coated on different parts of their inner surfaces with different phosphor materials, each capable of emitting light of a distinctive color when struck by electrons. When, as is usually the case, a three-color image is required the cells are preferably (but not necessarily) of hexagonal construction and two adjacent inner-surface areas of each cell are allotted to each component color. The prior art as to "honeycomb" screens is well exemplified in the copending application of A. C. Schroeder, Ser. No. 140,786, now U. S. Patent 2,579,705, and in the copending application Serial No. 159,071, of M. W. Green, now U. S. Patent No. 2,579,665.

Either a single electron-gun or a battery of three guns may be used in activating the different color-phosphors of a honeycomb screen. If three guns are employed they are disposed in equally spaced relation about the longitudinal axis of the tube so that each beam "sees" but two of the six phosphor-covered inner faces of each cell. When the tube contains but a single electron-gun, its beam is deviated and rotated to the points of origin of the three-gun beams, so that it too approaches the honeycomb at angles individual to the pairs of cell surfaces which are allotted to the different color-phosphors.

The principal difficulty encountered in the construction and operation of cathode-ray tubes containing a conventional honeycomb screen is that the angles-of-approach of each beam or beam part, are very critical. Thus, in some cases, if the beam departs even a fraction of a degree from its intended path the beam, or a part thereof, may impinge upon that portion of the screen which lies next adjacent to the surface area upon which it was intended to impinge. Since this "next adjacent" phosphor-covered area has a color-emissive characteristic other than that of the phosphor-covered area which was intended to be activated, the departure of the beam from its intended path results in color-dilution.

The problem of color-dilution is perhaps more frequently encountered in "one-gun" tubes than in "three-gun" tubes. This is so because in the latter type the point of origin of each beam is fixed during the assembly of the tube-parts and if the guns are correctly spaced (i. e. exactly 120° apart about a central axis) and correctly oriented (with respect to the phosphor-coated faces served by each gun) other factors (e. g. stray magnetic-fields) which give rise to color-dilution may be overcome by conventional means (e. g. "shielding"). In "one-gun" tubes, on the other hand, it is not always possible as a practical matter to ensure absolute uniformity in the construction, orientation and energization of the magnetic deflecting coils which serve selectively to direct the beam to the different color-phosphors.

Accordingly, the principal object of the present invention is to provide a means for minimizing color-dilution in projecting systems of the type employing a color-emissive screen or target-assembly of the cellular variety.

The foregoing and related objects are achieved, in accordance with the invention, by the provision of a three-dimensional cellular structure or grille wherein the pattern and distribution of the inner color-faces of its cells are such that the electron or other rays which miss the particular face toward which they were directed will enter the next adjacent cell and there impinge upon the face of that cell which is allotted to the same color (instead of impinging upon a face of a different color in the same cell). As in the "honeycomb" color-screens of the prior art, the individual cell-faces are of sub-elemental image-dimensions. Hence, in minimizing color-dilution by causing the rays to enter a cell other than the one toward which they were originally directed, the minute size and close spacing of said sub-elemental image areas renders this "inaccuracy" in the illumination of the screen unnoticeable to the human eye.

The invention is described in greater detail in connection with the accompanying drawing, wherein:

Fig. 1 is a partly broken away view in perspective of a three-gun color-kinescope containing the improved cellular target or screen of the invention.

Fig. 2 is end view looking into the color-screen from its target side.

Fig. 3 is a greatly enlarged view in perspective of a portion of the cellular structure and window of the screen of Fig. 1 and Fig. 4 is a view in perspective of an alternative cell structure for the target.

The color-kinescope shown in Fig. 1 comprises an evacuated envelope 1 having a bulbous portion or main chamber 3 which terminates in a transparent or translucent window 5 through which the obverse side 7s of an electron-sensitive honeycomb target or screen 7 of the "pointed" cellular construction, dictated by the present invention, is visible. This cellular target 7 comprises a bank of hollow metal cells 7a, 7b etc. arranged in contiguous rows with the several pointed ends p1, p2, p3 of each cell facing the source of electrons. The source of electrons is here exemplified by three electron-guns 11, 13 and 15 disposed 120° apart about the long central axis of the envelope.

When, as in the instant case, the kinescope is designed for use in a tri-color television system the individual cells or cylinders 7a, 7b, etc. of the honeycomb are preferably hexagonal in cross-section. One electron beam and two adjacent ones of the six inner faces of each cell, are allotted to the production of each of the three colors. Thus, as shown in Fig. 2, the inner faces which are designated $r, r'$ are coated with a phosphor material that emits red light, when struck by electrons, and the other pairs of inner faces $b, b', g, g'$ are provided, with suitable "blue" and "green" phosphor coatings respectively. Alternatively, the individual cells 7a, 7bc of which the target 7 is comprised may have a greater or smaller number of sides, or indeed may be circular, provided that corresponding portions of the inner surfaces of all of the cells are allotted to the same component colors of the system in which the tube is installed.

As is conventional in cathode-ray tubes of the type containing a "directional" screen of the cellular variety, when the electron-beams from the guns 11, 13 and 15 are subjected to a scanning movement, imparted by the magnetic coils 11c, 13c and 15c, the separate beams approach the screen from different directions. In the absence of any mechanical or electrical misalignment each beam "sees" but two of the six phosphor coated faces of the cell toward which it is directed. This ideal situation, however, does not always prevail and a beam may depart a degree or two from its intended path. In such case, if the cells of the honeycomb were of conventional (non-pointed) construction, at least a part of the beam would strike a corner portion of the differently colored face (of the same cell) which lies next adjacent to the phosphor area which the beam was supposed to strike, and color dilution would result. This undesired condition may be visualized if it is assumed, first, that the red beam, indicated by the arrows 11r, (Fig. 2) approaches the cell 7a of the honeycomb at the correct or normal angle required to activate its two "red" phosphor faces $r$ and $r'$. Here, obviously, there will be no color dilution since the phosphor coated faces $r$ and $r'$ are of the same (red) color. On the other hand, if the same (red) beam 11r is diverted, for any reason, and approaches a cell (say, the one designated 7b) a degree or two off its normal path then at least a peripheral portion of the beam will extend beyond the boundaries of the "red" phosphor and will activate at least the corner $x$ of the next adjacent (blue or green) face of that cell, thus diluting the red light resulting from the impact of the main portion of the beam upon the faces $r$ and $r'$.

In accordance with the present invention, color dilution resulting from minor departures of the beam from its normal path is minimized by cutting away the corners $x, x'$ of the cell which lie in the path of the misguided beam, so that it may proceed to another cell or row of cells where it will strike a phosphor-color area of the same light-emissive characteristics as the one upon which it was intended to impinge. Thus, the present invention contemplates and its practice provides an electron-sensitive target comprising a cellular structure wherein certain corners of the walls of the individual cells are cut away so that said walls have edges $e$ which slant off from spaced points p1, p2, p3 on the "target" side of the structure in the direction of its other or "viewing" side 7s.

The points p1, p2 etc. from which the edges $e$ of the individual cells "slant off" are at a terminal of the center-line of each red, blue or green phosphor area. Thus, irrespective of the direction of the undesired "drift" the beam will strike at least a portion of the particular cell toward which it was originally directed. Where, as in the illustrated embodiment of the invention, each cell has an even number of emissive faces disposed in intersecting planes, the points from which the cell-edges slant-off are at "alternate" corners and the direction of slant is toward the "intermediate" corners at the opposite or "viewing end."

In the interests of rigidity, the slanting edges $e$ of the cells 7a, 7b etc. may terminate at points short of the viewing side 7s of the target 7, as shown in Fig. 3. However, maximum correction for color-dilution is achieved (when the cells are of the same length) by extending the slanting edges $e$ substantially to the viewing side 7s of the target, as shown in Fig. 4. In either event, adjacent ones of the pointed hexagonal cells are so arranged with respect to each other that their three "high corner" and three "low corners" mutually intersect. Considered from another aspect, the points of the cells are so oriented with respect to the electron-guns of the tube that the open-spaces between the points of the cells comprise row-to-row extensions of the different angular paths which the electrons travel in their journey from said guns to the target.

The length dimension of the individual cells (i. e. the "thickness" of the honeycomb) is not especially critical and may conveniently be of the order of a quarter of an inch. If the cells are too long the range of angles within which the screen may be satisfactorily viewed is unnecessarily limited. The diameters of the cells should be chosen with a careful regard to the length and width dimensions of the entire screen and should ordinarily be of "sub-elemental image-dimensions," as that term is understood in the television art. The formula is:

$$d = \frac{h}{n}$$

where $d$ is the effective diameter of each cell, $h$ is the height or vertical dimension of the screen or target, $n$ is the total number of horizontal lines in the scanning raster.

From the foregoing description it will be apparent that the present invention provides new and useful means for minimizing color-dilution in color-kinescopes and similar cathode-ray tubes of the type employing a color-emissive screen or target assembly of the cellular variety.

What is claimed is:

1. An electron-sensitive target of the open-end cellular variety wherein the individual cells of the target comprise a rigid electron-sensitive wall having an edge that slants off from a point at the open end of the cell in the direction of the opposite end of said cell.

2. The invention as set forth in claim 1 and wherein said cell wall comprises an even number of plane faces disposed in intersecting planes and wherein said edge of said wall slants off from points at alternate ones of the corners of the intersecting planes at said open end of the cell in the direction of the intermediate corners at the other end of said cell.

3. The invention as set forth in claim 2 and wherein said individual cells are hexagonal in cross-section and wherein the electron-sensitive faces which lie adjacent to different ones of said points exhibit different color-emissive characteristics when struck by electrons.

4. A directional target of the cellular variety for use in cathode-ray tubes of the kind provided with means for projecting electrons into the open ends of the cells along different angular paths to impinge upon different phosphor covered areas of the inner surface of each cell, said target comprising a multiplicity of rows of hollow metal cells each having areas of its inner surface coated with phosphor materials each capable of emitting light of a color individual to a particular area, the phosphor covered areas of the same color characteristic facing in the same direction, said cells terminating in a plurality of spaced apart points each defining a boundary of one of said different phosphor-covered areas, and the open space between adjacent ones of said points comprising a row-to-row extension of one of said different electron paths.

5. A cathode-ray tube comprising an evacuated envelope containing, a cellular target comprising a multiplicity of rows of cylindrical metal cells each having an open end and adjacent areas of the inner surface of each cell coated with a phosphor material capable of emitting light of a color individual to a particular area, the phosphor covered areas of the same color characteristic facing in the same direction in all of said rows and the open ends of said cells terminating in a plurality of spaced-apart points each defining a boundary of said different phosphor-covered areas, and electron-gun means for projecting electrons into said open ends of said cells along different angular paths to impinge upon different ones of said phosphor-covered areas of the inner surface of each cell, said cellular target being so oriented with respect to said electron-gun means that the spaces between said spaced-apart points of said cells comprise row-to-row extensions of said different electron paths.

RUSSELL R. LAW.

REFERENCES CITED

The following references are of record in the file of this patent:

UNITED STATES PATENTS

| Number | Name | Date |
|---|---|---|
| 2,128,631 | Eaton | Aug. 30, 1938 |
| 2,182,451 | Ploke | Dec. 5, 1939 |
| 2,518,200 | Sziklai | Aug. 8, 1950 |